United States Patent [19]
Friese et al.

[11] 3,868,939
[45] Mar. 4, 1975

[54] FUEL INJECTION SYSTEM ESPECIALLY FOR COLD STARTING AND WARMING UP EXTERNALLY IGNITED INTERNAL COMBUSTION ENGINES

[75] Inventors: Karl-Hermann Friese, Leonberg; Friedbert Michel, Kornwestheim; Rudolf Krauss, Stuttgart; Günther Jäggle, Stuttgart; Gerhard Stumpp, Stuttgart; Josef Steiner, Stuttgart; Heinrich Knapp, Leonberg-Silberberg, all of Germany

[73] Assignee: Robert Bosch GmbH, Stuttgart, Germany

[22] Filed: Mar. 2, 1973

[21] Appl. No.: 337,571

[30] Foreign Application Priority Data
Mar. 3, 1972  Germany............................ 2210250

[52] U.S. Cl. ....... 123/179 L, 123/32 AH, 123/32 J, 239/135, 123/122 A, 123/34 A
[51] Int. Cl. ............................................. F02b 3/00
[58] Field of Search ............ 123/32 SJ, 145 A, 146, 123/122 A, 32 H, 34, 179 L, 32 J; 239/135

[56] References Cited
UNITED STATES PATENTS

| | | | |
|---|---|---|---|
| 1,780,499 | 11/1930 | Novelli............................ | 123/145 A |
| 2,855,908 | 10/1958 | Pflaum.............................. | 123/32 J |
| 3,408,007 | 10/1968 | Raichle................................. | 239/13 |
| 3,601,110 | 8/1971 | Kamazuka....................... | 123/32 EA |
| 3,731,876 | 5/1973 | Showalter............................. | 239/13 |
| 3,762,378 | 10/1973 | Bitonti.............................. | 123/122 E |

*Primary Examiner*—Charles J. Myhre
*Assistant Examiner*—Ronald B. Cox
*Attorney, Agent, or Firm*—Edwin E. Greigg

[57] ABSTRACT

An improved fuel injection system in an internal combustion engine is described, wherein the system has a discharge outlet for fuel to be injected and brought to a combustion space of the engine, an electrical heating element for heating the fuel directly upstream of the discharge outlet, a fuel entry structure for feeding fuel to the heating element and temperature control structure for controlling the heating by the heating element, at engine temperatures below the optimal operational engine temperature and as a function of engine temperatures influencing the formation of the fuel-air mixture in the combustion space, the fuel being heated to such a degree that the preponderant portion of the amount of fuel to be injected is converted to the gaseous phase not later than immediately after leaving the discharge outlet, and wherein the improvement comprises an internal space in the system, adapted for the flow of fuel therethrough and extending from the fuel entry structure to the discharge outlet, which space is laid out for the smallest fuel volume possible, but in any event has a volume smaller than the volume of fuel injectable during about eight work cycles of the engine while the latter is idling.

22 Claims, 9 Drawing Figures

FUEL INJECTION SYSTEM ESPECIALLY FOR COLD STARTING AND WARMING UP EXTERNALLY IGNITED INTERNAL COMBUSTION ENGINES

BACKGROUND OF THE INVENTION

This invention relates to a fuel injection system suitable especially for cold starting and warming-up externally ignited internal combustion engines, in which system heating of the fuel is effected by means of an electrical heating element located directly upstream of the injection discharge outlet, and is controllable by the engine temperatures which influence the formation of the fuel/air mixture. At engine temperatures below the optimal operational engine temperature, heating is effected to such a degree that the major portion of the fuel quantity to be injected and brought to the combustion space of the engine is converted, at the latest immediately after its discharge from the injection system, to the vapor phase which is necessary for combustion in the engine.

In the embodiments of a fuel injection system of this type described in patent application Ser. No. 201,901 filed on Nov. 24, 1971, and now abandoned by Gerhard Stumpp, Josef Steiner and Friedbert Michel for Apparatus For The Cold Starting and Warming Run of Spark Plug-Ignited Internal Combustion Engines, and assigned to the assignee of the present invention, it may occur, in particular when the idling internal combustion engine is suddenly accelerated, that the continuous running of the engine is interrupted or that the engine is stalled. Also in other operational ranges, the running of the engine may become irregular due to a discontinuous injection of gasoline.

OBJECT AND SUMMARY OF THE INVENTION

It is an object of the invention to provide an improved fuel injection system by means of which externally ignited internal combustion engines operated on carburettor fuel can be started cold, and wherein combustion and revving of the engine can be achieved from the first compression stroke if possible, without needing any extra amount of fuel and without enriching the fuel during the warming up period while, nevertheless, ensuring an undisturbed, steady running of the engine.

This object is attained by a fuel injection system according to the invention wherein the space to be filled by fuel in the system and extending from a fuel entry port of a heating element to a discharge outlet of the system (which space is also referred to hereinafter as the "waste space") is kept as small as possible, and is in any event smaller than the volume of fuel that must be injected into the internal combustion engine during approximately eight work cycles when the engine is idling. It is an advantageous result of this feature of the invention that any lack of fuel, which might cause interruption or stalling when the operation of the engine is suddenly changed from idling to full or partial load operation, is kept so small that the prevailing flywheel momentum of the internal combustion engine will be sufficient to compensate the drive loss occurring due to a temporary lack of fuel until the regular supply of fuel sets in anew. As a result of the small fuel intake space of the system between the heating element and the fuel discharge outlet, the amount of fuel vapor that can be present therein is also held small. This amount of vapor the proportionate share of which is decreasing at a constant heating output with increasing fuel throughput, must be replaced in part by liquid fuel when the operation of the engine is suddenly changed from idling to partial or full load operation. This leads in turn to a reduction in the quantity of fuel injected and to the drawbacks described hereinbefore, when the volume of the fuel intake space between the heating element and the fuel discharge outlet is too large.

In order to keep the fuel-filled space in the heating element and between the latter and the fuel discharge outlet as small as possible, a further embodiment of the invention has the electrical heating element located just upstream of the fuel discharge outlet of the system, in the pressure chamber of a fuel injection valve having a valve needle opening in the direction of fuel flow under pressure of the fuel being supplied and against the force of a return spring, and the heating element is protected by an insulation against heat losses to the surroundings of the injection valve. Thereby, the heating element is directly surrounded by the fuel to be warmed up, or it heats the latter indirectly via a heat transfer body having a large surface. This affords the further advantage that the heating up of the fuel will be effected very rapidly.

In order to prevent an irregular heating up of the fuel flowing through the electrical heating element, which would in turn lead to irregularities in the injection of the fuel, the electrical heating element is so designed, according to a further embodiment of the invention, that the velocity of fuel flow in the heating element is as large as possible, while the loss in fuel pressure is the same, as far as possible, at all fuel passages, and that, at maximal fuel throughput, this loss is maximally 10 to 15% of the valve opening pressure of the fuel. This has the advantage of avoiding local formation of gas bubbles which may cause blocking and a strong overheating of a part of the electrical heating element. Thus, it is also possible to eliminate the direct consequences of such partial overheating of the heating element, namely irregular injection and failure of the heating element.

In order to keep the above-described waste space between the heating element and the fuel discharge outlet as small as possible, a further embodiment of the invention provides for a tubular electrical heating element surrounding as a sleeve the valve needle of the injection valve, and an intermediate heating body may be provided between the valve needle and the heating element whereby the heating surface can be enlarged and the heating element can be of axially shortened shape.

In order to provide for an easily exchangeable heating element it is arranged upstream of the valve needle, viewed in the direction of fuel flow, and the valve needle is built very short, thereby saving further waste space.

In certain embodiments of the invention, the electrical heating element consists of a heating coil. This is advantageous because the heating element is easy to manufacture, moreover, the turbulence and the velocity of flow of the fuel at its passage through the heating coil are very considerable and the heat transfer to the fuel is very satisfactory.

In another embodiment of the invention, the heating element consists of two half shells coated with an electric current-conducting material. In order to adapt the heat output of this heating element to the decreasing temperature gradient between the fuel temperature and the temperature of the heating element, a preferred embodiment of this type of heating body is provided with a coating of electric current-conducting material the thickness of which on the carrier body increases in the direction of fuel flow.

In yet another embodiment of the invention, the electrical heating element consists of a number of capillary tubes and/or narrow gaps, or it consists of a whisker package. This embodiment has the advantage of affording a large surface of good heat transfer properties in a small space. In order to obtain a rapid heating up of the fuel and to avoid a heating up of the fuel prior to its entry into the electrical heating element, which would lead to irregular warming-up of the fuel and to discontinuous gasoline injection, the injection valve body is provided with a portion or reduced diameter, forming a heat throttle, at the end of the electrical heating element to which the fuel is supplied.

The formation of deposits on the heating element, due to cracking of the fuel, leads to disturbances in the functioning of the element and lastly to its failure. Depending on the length of the hydrocarbon molecules in the fuel, cracking of the latter will occur at lower or higher temperatures. Experience has shown that in the case of carburettor fuels serious disturbances will occur in the heating element from 300°C upward; Therefore, such temperatures should be avoided.

It is safest and most advantageous to avoid local strong heating causing formation of gas and cracking of the fuel that can in turn lead to irregular fuel injection and even to a destruction of the heating element, by making use of the fact that the heat output of the electrical heating element can be controlled by the specific dependence on temperature of the electric resistivity of the current-carrying material. In an advantageous embodiment of the invention the electrical heating element therefore, consists of a small tube of PTC material the electrical resistivity of which strongly increases at a temperature (the Curie point) which is safely below the cracking temperature of the fuel. Expensive additional regulator equipment can be dispensed with when making use of this phenomenon. Moreover, this regulating effect occurs at every point of the heating element whereby local heating up is also avoided even where high temperatures occur. The resistivity of the PTC material increases abruptly at the Curie point, so that there is a self-regulating effect achieved at this temperature.

In order to heep the resistivity of the small tube serving as heating element as low as possible, and to achieve a high heat output combined with a small waste space, a further embodiment of the invention provides for an electric current connecting means of the outer, and another such connecting means on the inner tubular wall surface which two connecting means are located radially opposite each other. In order to avoid that the connecting means cause a reduction in the internal diameter of the tube and thus disturb the flow of fuel therethrough, the tube is provided with a crimped rim at the end thereof at which the fuel is supplied thereto.

The tube itself and consequently the waste space therein can be kept particularly small if the tube is made of a PTC material having a particularly low resistance in the cold state.

A further embodiment of the invention is destined to achieve a very fine spraying and good distribution of the injected fuel and comprises an injection valve in which the opening pressure of the fuel is at least sufficiently high to attain the velocity of sound in the narrowest cross section area of the valve.

As the fuel will expand during heating and the resulting increase of fuel pressure in the system may cause opening of the injection valve and uncontrolled escape of fuel into the suction space of the engine, and the emission of noxious substances, overheating of the heating element and high current consumption resulting therefrom must be avoided, the fuel injection system according to the invention preferably comprises switch means whereby the electrical heating element can be turned on only when the engine is running; for the purpose of pre-heating, however, the heating element should also be energizable prior to starting the engine, the operation of the engine being detectable by a measuring device installed in the suction tube for measuring the air flow therethrough.

In order to ensure safety of operation and to avoid in particular self-ignition due to excessive heating up, of the fuel, the maximum temperature is kept below the self-ignition temperature even when smallest amounts of fuel are being injected.

The advantages afforded by the embodiments of the invention described hereinbefore also comprise the avoidance of a strong emission of noxious fumes which often occurs during the start and the warming up period of the engine and which is caused by the enrichment in fuel normally required for these operations. Other advantages afforded by the fuel injection system according to the invention are: a rapid and safe starting of the engine, an undisturbed changeover from idling to operation under partial or under full load, and, when a heating element made of PTC material is being used, a safe heating up of the fuel without the need for expensive regulating means.

The invention will be better understood and further objects and advantages will become more apparent from the ensuing detailed specification of preferred but merely exemplary embodiments taken in conjunction with the drawings.

DETAILED DESCRIPTION OF THE EMBODIMENTS

Figure 1:
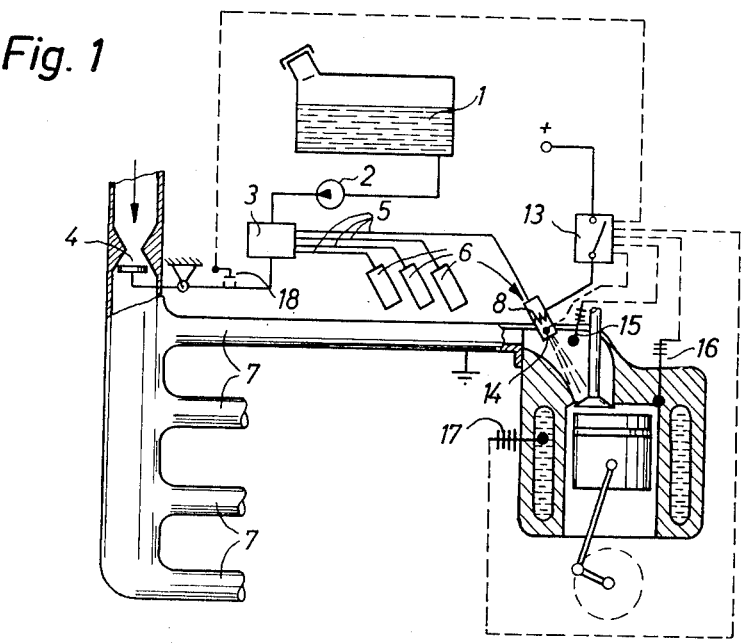
FIG. 1 is a schematical view of a cold-start and warming up arrangement built-on to an engine of an internal combustion engine and comprising four fuel injection units according to the invention.

From a fuel tank 1, the fuel is fed into a metering device 3 by means of a fuel pump 2. This metering device 3 receives its control signal from a measuring device 4 which detects the amount of air aspirated by the internal combustion engine. According to the aspirated air quantity, the metering device 3 allots the fuel via fuel supply lines 5 to the fuel injection valves 6. The injection valves 6 inject the fuel into the individual suction tubes 7 of the internal combustion engine. Each of the injection valves 6 is equipped with an electric heating element 8 which is provided with electrical feeder lines 9 and is protected by means of an insulation 10 against heat losses to the surroundings of the injection valve. The fuel discharge outlet 19 of the injection valve 6 is controlled by a valve needle 11, which opens in the direction of fuel flow under the pressure of the supplied fuel against the force of a return spring 12.

The heating output and the heating up of the fuel in the individual fuel injection valves 6 is controlled by a control device 13, which receives its signals from the temperature sensors 14, 15, 16, and 17 and from a switch 18.

The temperature sensor 14 reads the maximal fuel temperature in the fuel-filled space between the electric heating element 8 and the fuel discharge outlet 19. The temperature sensor 15 measures the temperature of the combustion air at the injection opening, the sensor 16 measures the temperature in the cylinder head and the sensor 17 measures the temperature of the cooling water in watercooled engines. Switch 18 is connected to the measuring unit 4 and transmits a cut-off signal to the control device 13, as soon as the measuring unit does not detect any further flow of air. This switch 18 may be bridged in order to preheat the injection valves 6 prior to the actual starting process.

The cold starting and warming-up injection system works as follows:

The electrical heating element 8 heats the fuel inside the injection valve 6 to a temperature at which the largest possible portion of the fuel is transferred to the vapor state, at least at the moment when it enters the suction tube 7 under pressure. At the same time, the opening stroke is so chosen, in order to achieve a satisfactory spray of the fuel, that the speed of sound is attained during the expansion in the narrowest cross sectional area of the fuel discharge outlet 19. In order that the fuel in the injection valve 6 is not brought to temperatures leading to cracking or even to self-ignition, heating of the fuel by the electrical heating element 8 is so controlled by the temperature sensor 14 and by the control device 13 that these temperatures are not attained.

In order to ensure a rapid warming-up and rapid adjustability and to avoid an excessive waste space, the heating element 8 is designed of the smallest possible mass and a large heat-transfer surface, and is insulated against the surroundings of the injection valve 6 in order to prevent undue heat losses.

The temperature sensors 15, 16 and 17 detect the operational conditions of the engine and will only interrupt the electrical current flow to the electrical heating element 8 of each injection valve 6 by means of the control device 13 when the optimal operational temperature of the engine has been attained. This is true for the period of cold start and the warming-up phase. The engine temperature may also drop considerably during normal operation, e.g., during prolonged driving downhill; in this case, the electric heating of the injection valves 6 can again be switched on.

In order that the fuel in the injection valves is only heated as long as fuel is being injected, i.e., as long as the internal combustion engine is in operation, the switch 18 has been provided which is connected to the measuring unit 4 and which will switch off the heating via control device 13, when the measuring unit does no longer measure any air flow in the air suction tube 7 of the internal combustion engine.

As it is advantageous for starting, if the fuel is already in a heated condition, at the moment when the engine is turned on, the switch 18 can be bridged shortly before the start. In order to obtain an undisturbed operation of the heated fuel injection valve 6, it is essential that the space occupied by the fuel in the heating element 8 and between the latter and the discharge outlet 19, is as small as possible. With a small fuel throughput, a part of the fuel will be converted to the vapor phase already prior to leaving the injection valve. The proportion of the fuel vapor to liquid fuel decreases with increasing throughput. When the engine has been idling which corresponds to a small fuel throughput, and then is to be fully accelerated, then a portion of the increased amount of fuel which is injected into the injection valve, is needed to replace that portion of fuel vapor, which results from the difference between the vapor portion during throughput in the idling engine and the vapor portion during the new desired throughput rate. This leads to a short fuel deficiency and thus to a loss in force, so that the run of the engine becomes uneven or the engine may even be stalled. These disturbances will not occur, when the waste space, i.e., when the volume of fuel that can be taken in intermediate the fuel inlet port into the electrical heating element and the fuel discharge outlet 19, is kept as small as possible, and in any case smaller than the fuel volume which is injected under idling motion during about eight work cycles of the combustion engine. In the drawings, FIG. 3 to FIG. 9 show embodiments of such injection valves in which the condition set forth above, has been observed.

Furthermore, it is of importance for an undisturbed running of the engine, that the fuel flows evenly through the heating element in the fuel injection valves, and that no vapor bubbles can be formed locally which may block the capillaries completely or partially. When the flow velocity of the fuel through the heating element is too small, a condition which will occur with large flow cross sectional areas, such gas formation may occur which will block parts of the heating surface. The heating output of the heating element will be accordingly reduced. As a consequence, the combustion engine will run unevenly. By providing passage cross-sectional areas of the heating element which are all of the same size, but, at the same time, all as small as possible, a high flow speed of fuel is achieved in all parts of the heating element, which is always sufficient to carry along with it any vapor bubbles formed. The throughput resistance which is thereby increased should, however, not become so large that a pressure loss is caused which is more than 10 to 15 percent of the valve opening pressure.

Figure 2:
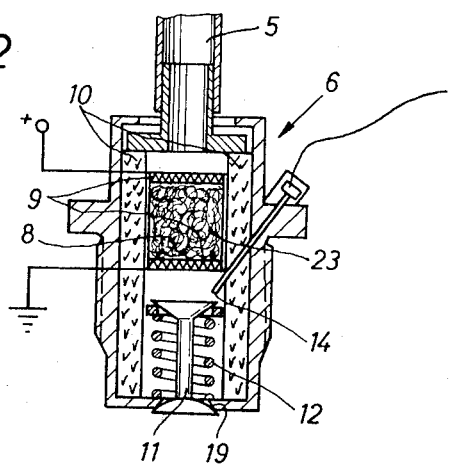
FIGS. 2, 3 and 4 are axial sectional views of a first, a second and a third embodiment of the fuel injection system according to the invention comprising a fuel injection valve with built-in heating element.
Figure 6:
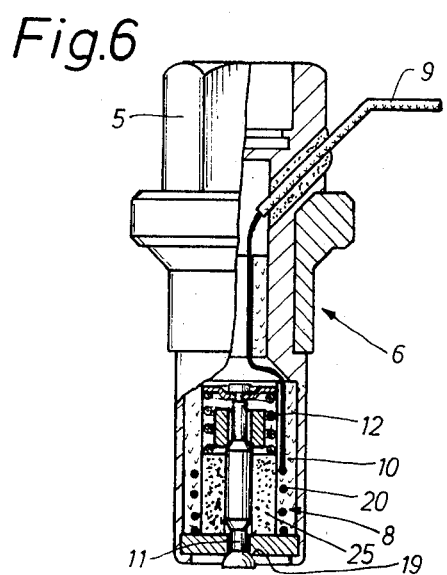
Figure 7:
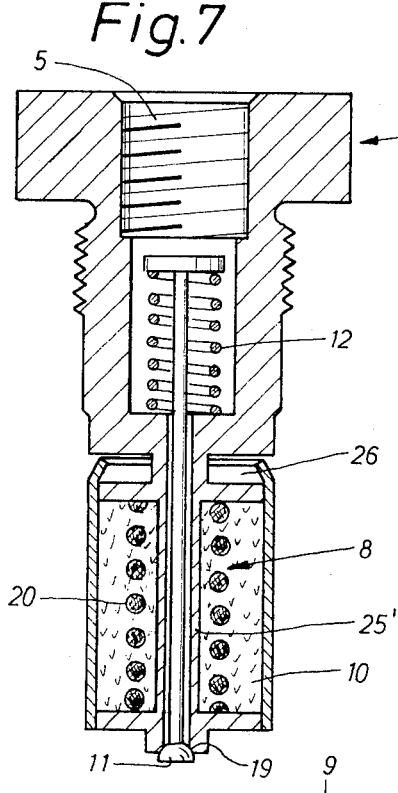
FIGS. 7, 8 and 9 are axial sectional views of a sixth, seventh and eighth embodiment of the fuel injection system according to the invention.

In order to keep the waste space mentioned above as small as possible, the heating element 8 is arranged to form a sleeve around the valve needle 11 of the injection valve 6. In FIG. 2, the electrical heating element consists of a whisker package 23 having a very large heatable surface which is placed upstream of the valve needle. The valve needle must be designed very short in order to obtain in this arrangement the required small waste space. In this embodiment as well as those of FIGS. 3, 4, 5, 8, and 9, the heating of the fuel is effected directly through the electric conductor through which current flows. In the embodiments of FIGS. 6 and 7 the current-carrying conductor of the electric heating element does not actually come into contact with the fuel. This has the advantage of safely avoiding the danger of two neighboring current-carrying parts touching one another and producing a short circuit.

Figure 3:
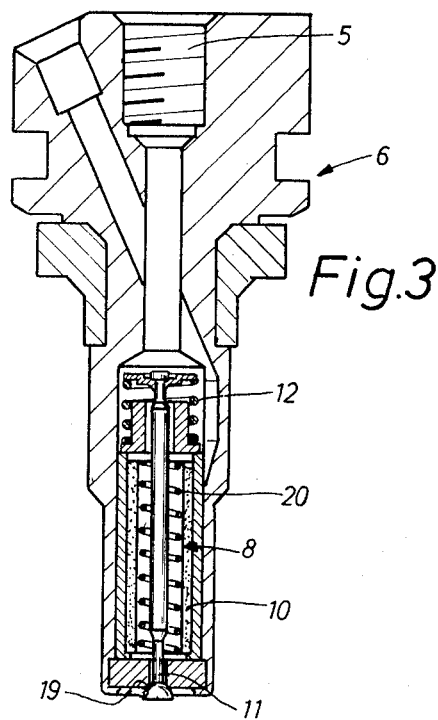

In the embodiments of FIGS. 3, 4, 5, 6, and 7, the electrical heating element 8 consists of a heating coil 20, which can be cheaply manufactured and the shape of which is adapted to the elongated shape of the valve needle so as to save space. By providing for a strong fuel throughput in this embodiment, a high heat transfer rate can be achieved within a small area. In FIG. 3 the heating coil 20 directly surrounds the valve needle 11 of the fuel injection valve 6 and is protected on the outside against loss of heat by the insulation means 10. In this embodiment the valve needle 6 is guided with play while maintaining the necessary clearance to prevent a short circuit at the heating coil. In this arrangement the working performance of the valve needle 11 is not influenced. In the embodiment according to FIG. 4, valve needle 11 extends through an intermediate member 21 which is itself surrounded by the heating coil 20. In this embodiment the heating element 8 is also protected on the outside by means of an insulation means 10 against loss of heat. In the space between insulation 10 and intermediate body 21, a strong fuel flow will prevail. Because of the larger heating surface which is due to the larger coil-diameter, this embodiment of the valve can be built shorter.

Figure 5:
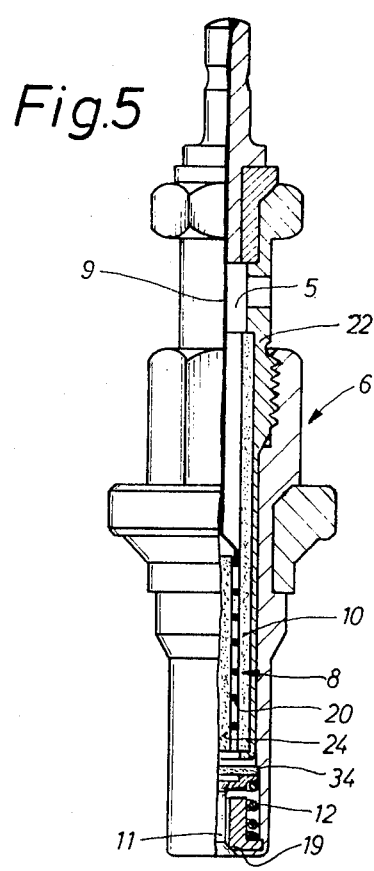
FIGS. 5 and 6 are partially sectional front views of a fourth and fifth embodiment of the fuel injection system according to the invention.
Figure 4:
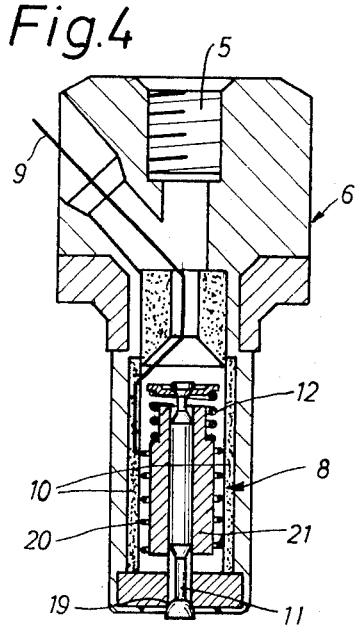

In the embodiment shown in FIG. 5, the electrical heating element 8 is constructed as an exchangeable inset 22 which is built into the injection valve in an axial position. In this embodiment, the heating coil 20 is located between a plug 24 and a sleeve-shaped insulation member 10. The valve needle 11 is of very short shape, in order to keep the waste space small. A screen 34 between the heating element 8 and valve needle 11 prevents impurities from passing to the fuel discharge outlet 19, when the heating element is exchanged.

In the embodiments shown in FIGS. 6 and 7, the heating coil 20 of the electrical heating element 8 is located inside the insulation means 10; however, the coil 20 is so tightly wound, as to ensure a good heat transfer to the heat transfer member 25, 25'. In order to obtain a large heat transfer within a small area, the heat transfer member 25 consists of a sintered material through which the fuel flows. Because of the undisturbed heat transfer from the heating coil 20 to the heat transfer member 25, 25', no local overheating caused by vapor bubble formation or due to failure of the heating coil can occur. The waste space can be kept very small because of the large heat transfer surface, and due to the texture of the sintered material the cross sectional areas of fuel flow are largely of even size and sufficiently narrow so that no accumulations of gas bubbles can form.

In the embodiment shown in FIG. 7 the heat transfer member 25' is constructed by a part of the body of the injection valve. As, in particular in this embodiment, heat is directly transferred to the valve body, a narrowed diameter 26 in the valve body has been provided, which forms a heat impedance upstream of the fuel entry face of the electrical heating element. Thus, the flow of heat to the fuel inlet side of the injection valve is impeded, so that no fuel can evaporate there prior to entering the heating element 8.

Figure 8:
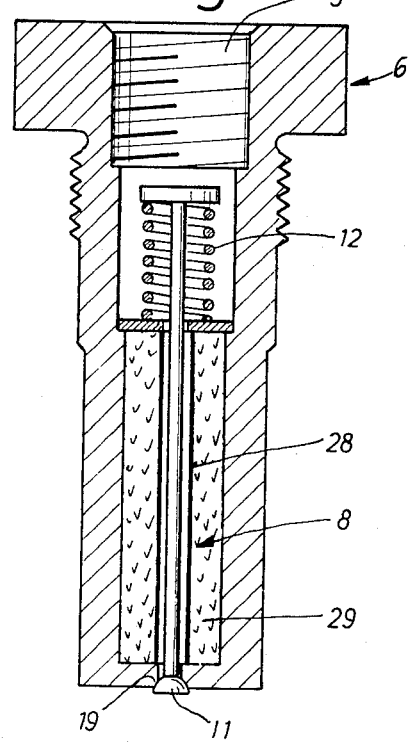

In the embodiment shown in FIG. 8, a fuel injection valve 6 is shown, comprising a heating element 8 which consists of at least one tubular carrier body 29, for example, formed by two half shells for insulating material which is coated with current conducting material and surrounds the valve needle 11. In this case, the waste space can also be kept very small. In the narrow annular gap between valve needle 11 and heating element 8, high flow speeds can occur, whereby a good heat transfer is ensured. As the temperature difference between the heated-up fuel and the surface temperature of the current-carrying material 28 decreases in the direction toward the discharge opening 19, a lesser heating performance is needed in the direction toward the discharge opening. Accordingly, in this embodiment of the invention, the thickness of the coating on the carrier body 29 is chosen so that it increases in the direction toward the discharge opening corresponding to the above-mentioned decreasing temperature difference. The thickness of the layer can increase by factors of 2 or 3.

Figure 9:
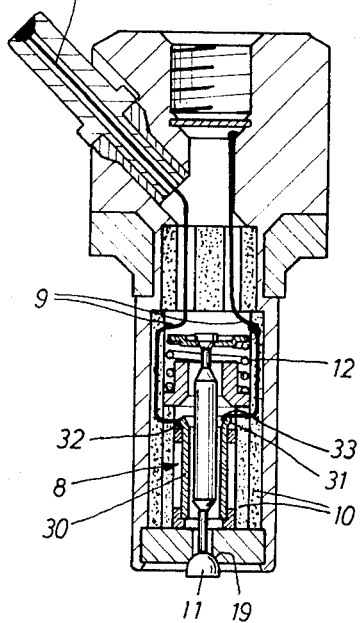

In the embodiment shown in FIG. 9, the electrical heating element consists of a small tube of PTC material which surrounds the valve needle 11. In this arrangement, a very small waste space can also be attained. This embodiment has the great advantage that, by employing PTC material, the heating performance of the heating elemnt 8 is self-adjusting. If there is a discontinuous flow of fuel, due, e.g., to vapor bubble formation, the tube 30 may be intensely heated locally, which leads to further vapor bubble formation; this may block the heating surface and decrease the total heating performance of the electrical heating element. If, however, the tube 30 of PTC material is heated to the Curie-point, then the electrical resistivity of the current-carrying material will rise abruptly, whereby the current supply is throttled, and the heating performance decreases. The ensuing cooling may cause the gas bubbles to be condensed or, when the surface tension becomes smaller, they may be carried away by the fuel flow. By means of this self-regulating heating element, it becomes possible to heat up the fuel with an optimal degree of continuity. In this case, the Curie temperature should be lower than the cracking temperature of the fuel. Cracking will occur at different temperatures depending on the length of the hydrocarbon chains. The functioning of the heating elements will be seriously impaired by deposits formed on the heating body due to cracking; it occurs at temperatures above 300°C, a temperature which must therefore be avoided in any event. In order to keep the resistance to current flow through the tube 30 as low as possible, the electrical hookup to the tube 30 in the advantageous embodiment shown in FIG. 9 is arranged in such a manner that one of the contactors 32 is on the outside and the other contactor 33 is on the inner wall surface of tube 30, the contactors being situated opposite each other in a radial position. So as not to have the annular gap between the tube 30 and valve needle 11 influenced by these contactors 32 and 33, tube 30 is provided at its end with a crimped rim 31, on which the contactors 32, 33 are located. By this arrangement and by using a PTC material, a high heating performance can be provided within a small area. Furthermore, an injection valve of this type has the advantage that the sensor 14 as well as a separate regulation for limiting the maximal temperature can be dispensed with.

The installations described above have the effect that the preponderant part of the fuel is transformed into the vapor phase at the latest immediately after leaving the injection device. Fuel carried into the combustion chamber in the vapor phase has a markedly smaller tendency to condense on the as yet cool walls of the combustion chamber or the walls of the inlet tube than has fuel which is only atomized. Therefore almost the entire amount of fuel brought in is available to form a mixture so that it is unnecessary to provide a fuel excess to replace condensed fuel. The most favorable starting conditions are given when fuel exits 100% in the vapor phase. However, the portion in the vapor phase should be at least 50 percent.

What is claimed is:

1. In an internal combustion engine of the type having a combustion space and a fuel injection system comprising:
   a. a discharge outlet for fuel to be injected and brought to said combustion space;
   b. an electrical heating element for heating fuel to be injected, directly upstream of said discharge outlet;
   c. a fuel entry means for feeding fuel into said heating element; and
   d. temperature control means for controlling the heating of said fuel by said heating element, dependent on an engine temperature influencing the formation of a fuel/air mixture in said combustion space, said temperature control means causing the fuel to be heated, at temperatures below the optimal operational temperature of the engine, to such a degree that the preponderant portion of the amount of fuel to be injected is converted to the gaseous phase at the latest immediately after leaving said discharge outlet;
   the improvement of said injection system comprising further an internal space adapted for the flow of fuel therethrough and extending from said fuel entry means to said discharge outlet, said space having a volume smaller than the volume of fuel injectable during about eight work cycles of said engine while the latter is idling.

2. The improvements as described in claim 1, wherein said injection system further comprises an injection valve housing, a valve needle, a return spring, a pressure chamber, and insulation means surrounding said heating element, said valve needle being adapted for opening in the direction of fuel flow under the pressure of the fuel supplied to said injection valve and against the force of said return spring, and said electrical heating element being located in said pressure chamber.

3. The improvement as described in claim 2, wherein said injection system comprises a plurality of passages for the flow of fuel therethrough all of which are laid out so that the loss of fuel pressure at maximum fuel throughout is at most 15 percent of the fuel pressure required to open said injection valve.

4. The improvement as described in claim 2, wherein said electrical heating element is adapted for direct contact with fuel flowing through said injection valve.

5. The improvement as described in claim 3, wherein said heating element comprises passages for fuel flow permitting transfer of heat from said heating element to the fuel and being laid out for maximum velocity of fuel flow.

6. The improvement as described in claim 4, wherein said electrical heating element is of sleeve shape and surrounds said valve needle.

7. The improvement as described in claim 5, wherein electrical heating element is of sleeve shape and said wherein a heat transfer body is arranged about said valve needle guiding the latter with play, said heat transfer body being in turn surrounded by said sleeve-shaped electrical heating element.

8. The improvement as described in claim 2, wherein said electrical heating element is removable from said pressure chamber and is arranged upstream of said valve needle in said valve housing.

9. The improvement as described in claim 2, wherein said electrical heating element is a heating coil.

10. The improvement as described in claim 2, wherein said electrical heating element comprises at least one carrier body coated with a layer of electric current-conducting material.

11. The improvement as described in claim 10, wherein the thickness of said layer on said carrier body increases in the direction of flow of fuel through said injection system.

12. The improvement as described in claim 6, wherein said electrical heating element comprises a number of capillary tubes.

13. The improvements as described in claim 6, wherein said electrical heating element has a number of narrow gaps therethrough.

14. The improvement as described in claim 6, wherein said electrical heating element consists of a whisker package.

15. The improvement as described in claim 2, wherein said injection valve housing has a passage of reduced diameter at the end of said electrical heating element toward said fuel entry means, said passage acting as a heat throttle.

16. The improvement as described in claim 6, wherein said electrical heating element comprises a current-carrying member consisting of PTC material, whereby the heat output of said heating element is made dependent of the change of resistivity of said PTC material with the temperature.

17. The improvement as described in claim 16, wherein said electrical heating element comprises a tube of PTC material having a Curie point below the cracking temperature of the fuel.

18. The improvement as described in claim 17, wherein said electrical heating element comprises two current-feeding contactor means arranged radially opposite one another, one on the outside surface and the other on the inside surface of the wall of said tube of cold-conductor material.

19. The improvement as described in claim 18, wherein the tube has a crimped rim at the end thereof toward said fuel entry means, and wherein said conductors are mounted on said crimped rim.

20. The improvement as described in claim 2, wherein said injection system further comprises switch means whereby said electrical heating system can be switched on, firstly, when said internal combustion engine is rotating, and secondly, prior to starting said engine, in order to preheat the fuel.

21. The improvement as described in claim 20, wherein said fuel injection system further comprises a suction tube for aspirating air and measuring device for determining the flow of air through said suction tube, air flowing through said suction tube when said internal combustion engine is rotating and thus giving an impulse to switch on the heating system.

22. The improvement as described in claim 2, wherein said fuel injection system further comprises means for controlling the temperature of the fuel in said system and for maintaining such fuel temperature below the temperature of self-ignition even when very small quantities of fuel are being injected by said system.

* * * * *